United States Patent
Hiller et al.

(10) Patent No.: US 11,098,614 B2
(45) Date of Patent: Aug. 24, 2021

(54) TURBINE HOUSING FOR A TURBOCHARGER OF AN INTERNAL COMBUSTION ENGINE, AND TURBOCHARGER

(71) Applicant: CONTINENTAL AUTOMOTIVE GMBH, Hannover (DE)

(72) Inventors: Marc Hiller, Alzey (DE); Mathias Bogner, Straubing (DE)

(73) Assignee: Vitesco Technologies GmbH, Hannover (DE)

( * ) Notice: Subject to any disclaimer, the term of this patent is extended or adjusted under 35 U.S.C. 154(b) by 395 days.

(21) Appl. No.: 16/095,766

(22) PCT Filed: Mar. 22, 2017

(86) PCT No.: PCT/EP2017/056856
§ 371 (c)(1),
(2) Date: Oct. 23, 2018

(87) PCT Pub. No.: WO2017/190884
PCT Pub. Date: Nov. 9, 2017

(65) Prior Publication Data
US 2020/0332677 A1    Oct. 22, 2020

(30) Foreign Application Priority Data
May 4, 2016   (DE) .......................... 102016207745.7

(51) Int. Cl.
*F01D 25/14*  (2006.01)
*F01D 25/26*  (2006.01)
*F02C 6/12*  (2006.01)

(52) U.S. Cl.
CPC .......... *F01D 25/145* (2013.01); *F01D 25/26* (2013.01); *F02C 6/12* (2013.01); *F05B 2220/40* (2013.01);
(Continued)

(58) Field of Classification Search
CPC ........ F01D 25/14; F01D 25/145; F01D 25/26; F05B 2220/40; F05B 2240/14; F05B 2260/231; F02C 6/12
See application file for complete search history.

(56) References Cited

U.S. PATENT DOCUMENTS 3,310,940 A  *  3/1967  Oetliker ................ F01D 25/145
                                                      60/804
4,735,556 A  *  4/1988  Fujikake ............... F01D 25/145
                                                      165/904

(Continued)

FOREIGN PATENT DOCUMENTS

DE              852788 C      10/1952
DE       102007024130 A1      12/2008
(Continued)

*Primary Examiner* — Brian P Wolcott
(74) *Attorney, Agent, or Firm* — Laurence A. Greenberg; Werner H. Stemer; Ralph E. Locher

(57) ABSTRACT

A turbine housing for a turbocharger of an internal combustion engine includes an annular duct for conducting an exhaust-gas mass flow to a turbine wheel to be disposed in the turbine housing and an exhaust-gas discharge duct for discharging the exhaust-gas mass flow from the turbine housing after impinging on the turbine wheel. An insulating element is respectively disposed in a region of an inner wall of the annular duct and in a region of an inner wall of the exhaust-gas discharge duct. A turbocharger having the turbine housing is also provided.

13 Claims, 3 Drawing Sheets

(52) U.S. Cl.
CPC ..... *F05B 2240/14* (2013.01); *F05B 2260/231* (2013.01)

(56) References Cited

U.S. PATENT DOCUMENTS

| | | | |
|---|---|---|---|
| 9,097,121 B2 * | 8/2015 | Joergl | F04D 29/403 |
| 9,784,124 B2 | 10/2017 | Oki | |
| 9,828,873 B2 * | 11/2017 | Maeda | F01D 25/10 |
| 10,634,042 B2 * | 4/2020 | Yokoyama | B22F 3/1055 |
| 2011/0008158 A1 * | 1/2011 | Boening | F02C 6/12 |
| | | | 415/200 |
| 2013/0004291 A1 | 1/2013 | Williams | |

FOREIGN PATENT DOCUMENTS

| | | | | |
|---|---|---|---|---|
| DE | 102008011258 A1 | | 9/2009 | |
| DE | 102008058156 A1 * | | 6/2010 | F01D 25/26 |
| DE | 112010004180 T5 | | 9/2012 | |
| EP | 0374603 A1 * | | 6/1990 | F01D 25/145 |
| EP | 0374603 A1 | | 6/1990 | |
| EP | 2570620 A1 * | | 3/2013 | F01D 25/145 |
| EP | 2592240 A1 * | | 5/2013 | F01D 25/145 |
| EP | 2592240 A1 | | 5/2013 | |
| EP | 2889455 A1 | | 7/2015 | |
| WO | 2008141927 A1 | | 11/2008 | |
| WO | WO-2008141927 A1 * | | 11/2008 | F01D 25/26 |

\* cited by examiner

TURBINE HOUSING FOR A TURBOCHARGER OF AN INTERNAL COMBUSTION ENGINE, AND TURBOCHARGER

BACKGROUND OF THE INVENTION

Field of the Invention

The invention relates to a turbine housing for a turbocharger of an internal combustion engine. The invention furthermore relates to a turbocharger having such a turbine housing.

A cooled housing for a turbocharger is known from DE 10 2008 011 258 A1. A water-cooled turbocharger with thermal insulation is known from EP 2 889 455 A1.

Exhaust-gas turbochargers are being increasingly used to increase power in motor-vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, i.e. the power of the internal combustion engine can be increased.

To this end, the exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine rotor arranged therein, which is driven by the exhaust-gas mass flow. The fresh-air compressor has a compressor housing and a compressor rotor arranged therein, which builds up a boost pressure. The turbine rotor and the compressor rotor are arranged for conjoint rotation on the opposite ends of a common shaft, referred to as the rotor shaft, and form what is referred to as the turbocharger rotor. The rotor shaft extends axially between the turbine rotor and compressor rotor through the rotor bearing arranged between the exhaust-gas turbine and fresh-air compressor, and is provided in said rotor bearing with rotary support in the radial and axial directions in relation to the rotor shaft axis. According to this construction, the turbine rotor driven by the exhaust-gas mass flow drives the compressor rotor via the rotor shaft, thereby increasing the pressure in the intake tract of the internal combustion engine, based on the fresh-air mass flow downstream of the fresh-air compressor, and thereby ensures better filling of the combustion chamber with atmospheric oxygen.

SUMMARY OF THE INVENTION

One object underlying the invention is to specify a concept for a turbine housing of a turbocharger which contributes toward efficient operation of a turbocharger.

A turbine housing for a turbocharger of an internal combustion engine is disclosed. The turbine housing has an annular duct for conducting an exhaust-gas mass flow to a turbine wheel that is arrangeable in the turbine housing. In other words, the annular duct in the turbine housing is formed such that the exhaust-gas mass flow can impinge radially and/or axially on the turbine wheel in a targeted manner. Furthermore, the turbine housing has an exhaust-gas discharge duct for discharging the exhaust-gas mass flow from the turbine housing after impinging on the turbine wheel. The exhaust-gas discharge duct is formed in the turbine housing such that the exhaust-gas mass flow from the turbine housing can flow out after flowing through (impinging on and flowing around) the turbine wheel. An insulating element is arranged in a region of an inner wall of the annular duct and in a region of an inner wall of the exhaust-gas discharge duct, respectively.

Each insulating element serves to thermally insulate the turbine housing in the abovementioned regions of the inner walls. In other words, an insulating element is thermal insulation. As a result, the turbine housing is insulated, in said regions, from heat of the exhaust-gas mass flow guided through the turbine housing during operation of the turbocharger.

In the region of the respective inner walls, this means that the inner wall of the annular duct or of the exhaust-gas discharge duct, respectively, is provided at least partially or entirely with the particular insulating element. In other words, the insulating elements at least partially line the annular duct and the exhaust-gas discharge duct, respectively, or are arranged at least partially on these inner walls. The insulating elements are separate, individual elements, which are not connected together. Put another way, the turbine housing has insulating elements on the inside only in predetermined regions.

In the described turbine housing, selective thermal insulation is achieved, which is able to be brought about easily by the use of insulating elements. For example, complicated introduction of insulating cavities into the turbine housing is dispensed with. This contributes toward little installation space being taken up by the turbine housing. The insulation in the annular duct prevents a not inconsiderable part of the thermal energy inherent to the exhaust-gas mass flow from being discharged via the turbine housing or local cooling additionally provided around the annular duct. This is the case in particular when the housing is produced from a metal material which ensures good heat conduction. As a result of the insulating element in the annular-duct region, the exhaust-gas mass flow can impinge on the turbine wheel at a higher temperature (and thus with greater enthalpy) compared with a non-insulated annular duct, thereby contributing toward a particularly efficient turbine power or high level of turbine efficiency. This is advantageous in particular for improving what is referred to as the "time to torque" (i.e. the time until a desired torque is reached) and the "low end torque" (at which the desired torque has not yet been reached) of the internal combustion engine. A loss of thermal energy before the turbine wheel is impinged upon would be thermodynamically undesired, such energy for driving the turbine wheel, inter alia, would be lost. The described turbine housing thus contributes toward efficient operation of a turbocharger. A contribution is also made toward lowering component temperatures of the turbine housing selectively to a desired level.

On account of the two insulating elements, lower demands, in particular of a mechanical nature, can be placed on the turbine housing compared with a non-insulated turbine housing. For example, a less heat-resistant material can be used, resulting in cost savings for the turbine housing. For example, it is not necessary to use a particularly expensive, highly heat-resistant material for the turbine housing. A further advantage is that, for example, it is not necessary for relatively large quantities of heat to be dissipated in a cooling system, to which end adaptations of the cooling system of the motor vehicle might be necessary, which would be disadvantageous in terms of costs and possibly of a space requirement. Furthermore, it is not necessary to provide comprehensive, all-encompassing cooling, for example in the form of a cooling jacket with water cooling, in order to bring component temperatures to an appropriately low level, such that the materials withstand the loads in operation. It is also possible to dispense with optional heat protection sheets which are introduced during the assembly of a turbocharger and secured mechanically (clamping, screwing or the like).

According to one configuration, with respect to a longitudinal axis of the turbine housing, the turbine housing has a sealing contour, which is free of any insulating element, between the exhaust-gas discharge duct and the annular duct. This contributes toward the above-described selective thermal insulation of the turbine housing. The fitting of insulation or insulation elements is typically subject to tolerances, and this can be disadvantageous in particular during the assembly of the turbocharger. The sealing contour is a turbine-housing portion which forms a gap with an outer contour (projected into a plane extending through an axis of rotation of the turbine wheel) of the turbine wheel. In other words, the sealing contour an inner-wall portion of the turbine housing. This sealing contour is machined such that the turbine wheel can rotate about the axis of rotation in a friction-free manner with the smallest possible spacing from the turbine housing. The gap should in this case be so small that virtually no energy of the exhaust-gas mass flow is lost by flowing past or around the turbine wheel. According to the configuration, an insulating element in the region of the sealing contour is dispensed with, in order to keep the tolerance chain of the gap as small as possible.

According to a further configuration, the turbine housing is free of any insulating element in a region of a wastegate valve seat, in a region of a bearing-housing connection flange and/or in a region of an exhaust-gas connection flange. This contributes toward the selective thermal insulation, similarly to above. As described above, these regions are machined regions on which high tolerance demands are placed.

According to a further configuration, at least one of the insulating elements is in the form of a layer which is applied at least partially to the corresponding inner wall of the annular duct and/or of the exhaust-gas discharge duct. The coating contributes toward the thermal insulation of the turbine housing. For example, the layer is a thermal barrier layer or coating.

According to a further configuration, at least one of the insulating elements is in the form of an inlay element which has been inserted into the turbine housing or has been at least partially molded in or at least partially encapsulated. Such an inlay element can also be referred to just as an inlay. This contributes toward particularly easy and cost-effective assembly.

In particular when the insulating element is merely inserted into the housing, no further fastening measures therefor are necessary. For example, the inlay element can be inserted into the turbine housing counter to a spring force and thus be clamped in place. Optionally, collars or shoulders can be provided in the turbine housing for the insertion, these contributing toward secure mechanical fixing of the insulating element(s). As a result of the inlay element(s) being molded in or encapsulated, a firm connection to the turbine housing is achieved during molding. Accordingly, the inlay element(s) is/are introduced into a corresponding mold before molding. In the case of molded-in inlays, additional mechanical fixing in addition to the optionally present form fit is not required. This is advantageous in particular for exhaust-gas turbochargers with an integrated wastegate valve.

The inlay element is adapted to a shaping of the turbine housing, in particular to a shaping of the annular duct, also spiral housing part, or of the exhaust-gas discharge duct. In other words, a form fit of the inlay element in the turbine housing is achieved.

According to a further configuration, the insulating element is formed in a multilayer manner, wherein a second insulating layer follows a first layer which, during operation, faces an exhaust-gas mass flow and exhibits a material resistant to high temperatures. As a result, the insulating layer is protected from direct contact with the exhaust-gas mass flow.

According to a further configuration, the insulating element has a third layer, which follows the second layer and faces the corresponding inner wall of the annular duct and/or of the exhaust-gas discharge duct. As a result, the insulating layer is arranged between the first and third layers. In other words, the third layer terminates the insulating layer. For example, the insulating layer is enclosed by the first and third layers.

The insulating layer can also be referred to as an insulating material or insulating layer. Suitable insulating materials are for example ceramic materials. The first and third layers are for example metal layers, for example layers made of aluminum materials. In particular, use is made for example of metal materials, which exhibit particularly little wear and are resistant to high temperatures.

According to a further configuration, the third layer forms a firm connection with the turbine housing. For example, only the third layer is molded in, similarly to above, during the production of the turbine housing, and thus forms a firm connection with the molded material.

Alternatively, the inlay element or inlay is formed such that it is adapted to a shaping of the contour of the inner wall for a form fit with the turbine housing. In other words, the inlay element is adapted to the turbine housing in terms of geometric dimensions.

According to a further configuration, at least one of the insulating elements exhibits a metal foam. For example, the second layer is produced from a metal foam. As a result, the thermal insulation can be achieved. On account of the porous structure, lower thermal conductivity is achieved compared with a solid material. For example, the pores include air, which acts as insulation.

According to a further configuration, the turbine housing has local cooling in the region of a sealing contour, in the region of a bearing-housing connection flange and/or in the region of the exhaust-gas connection flange. The sealing contour, the bearing-housing connection flange (for instance in the region of what is referred to as the p3 side or of what is referred to as the p3 space of the turbine housing) and the exhaust-gas connection flange (for instance in the region of what is referred to as the p4 side or of what is referred to as the p4 space of the turbine housing) are regions of the turbine housing on which high tolerance demands are placed on account of the mechanical connection to other components, as mentioned above in relation to the sealing contour. In these regions, cooling is provided locally, such that the turbine housing is cooled selectively in combination with the insulation. In other words, cooling is effected selectively only in the regions of the turbine housing in which high demands are placed on mechanical tolerances. As a result, the turbine housing can be produced from a light metal material, in particular an expedient material that is not resistant to high temperatures, this contributing toward cost-effective production of the turbine housing and thus of a turbocharger. As a result of the combination of insulation and cooling, the component temperatures of the turbine housing can be lowered to a required level. As a result, it is possible, for example, in the case of fluidic cooling, for a required quantity of coolant and a quantity of heat introduced into a cooling circuit to be reduced to a minimum. Overall, this contributes toward an increased turbine efficiency, in particular compared with housings that are completely cooled peripherally. Furthermore, as a result of the clever subdivision and combination of the insulating elements and the cooling, it is additionally possible to calibrate the cooling performance in an optimal manner to a deformation behavior of the turbine housing, in particular in the region of the sealing contour. It is not necessary for overall cooling to be provided, but rather only selective cooling.

The local cooling is for example water cooling with cooling ducts or cooling jackets. For example, these are ducts in the turbine housing, through which a coolant such as water can flow in order to dissipate heat from the turbine housing.

According to a further configuration, the turbine housing has local cooling in the region of a wastegate valve seat. This makes the abovementioned advantages and functions possible, similarly to above. In particular, a valve body or a valve flap of the wastegate valve becomes very hot during operation of a turbocharger, and so heat can be introduced into the housing. This would be disadvantageous with regard to wearing of the wastegate valve or of the valve seat during operation, in particular when a material that is resistant to high temperatures is not used. In order to protect the wastegate valve seat from wear and excessive deformations, which would be disadvantageous for tightness of the seat, heat is dissipated by means of the local cooling. This makes the abovementioned advantages and functions particularly possible.

Also disclosed is a turbocharger for an internal combustion engine, which has a bearing housing in which a rotor shaft is mounted in a rotatable manner. The turbocharger also has a turbine wheel, which is arranged for conjoint rotation on the rotor shaft. The turbocharger also has a turbine housing according to one of the above-described configurations, which is mechanically secured to the bearing housing.

The turbocharger allows substantially the abovementioned advantages and functions.

Further advantages and functions are disclosed in the following detailed description of an exemplary embodiment.

The exemplary embodiment is described in the following text with the aid of the appended figures. Elements that are of identical type or act identically are provided with the same reference signs throughout the figures.

DESCRIPTION OF THE INVENTION

Figure 1:
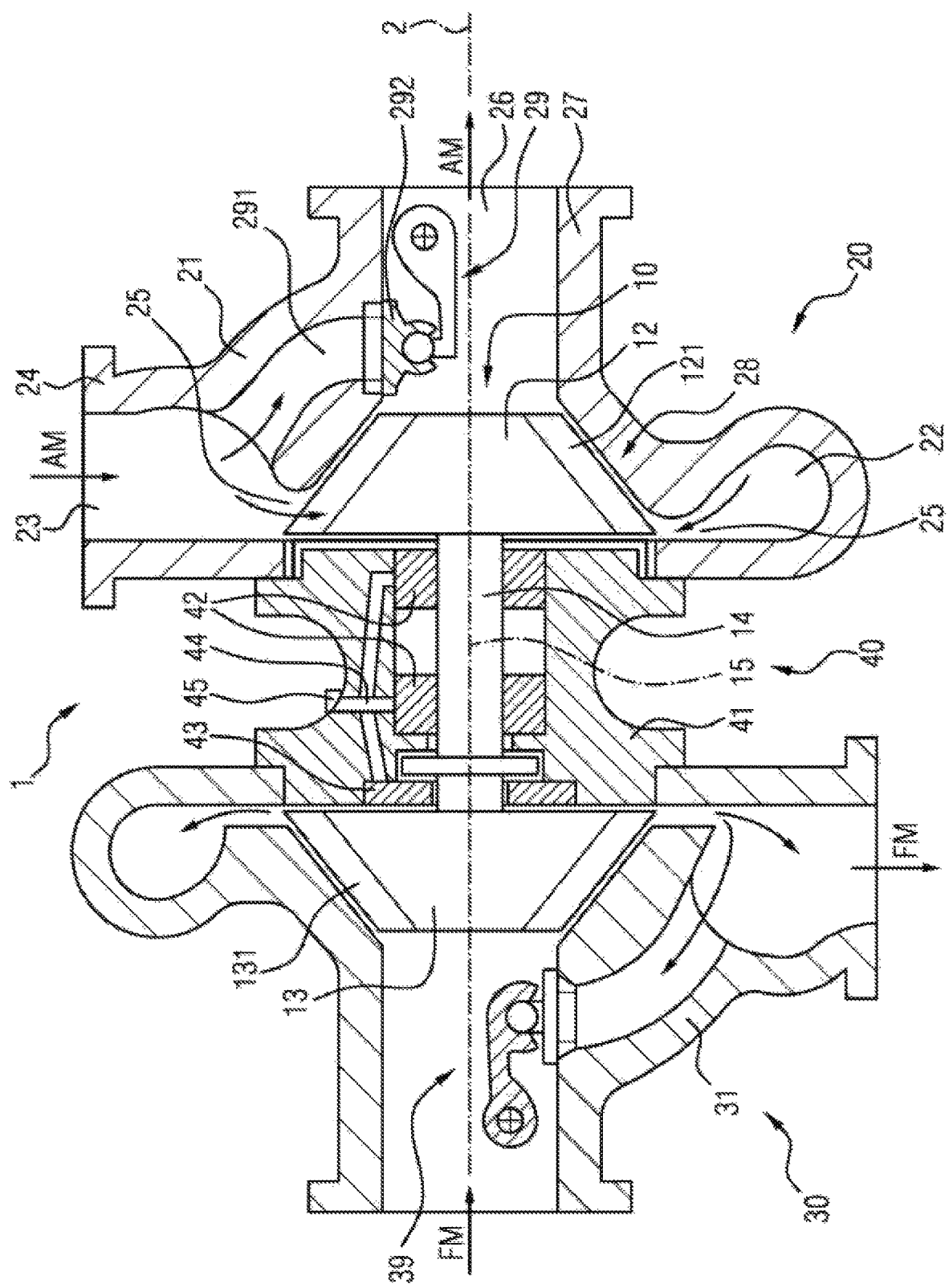
FIG. 1 shows a schematic sectional view of a turbocharger.

FIG. 1 schematically shows a sectional illustration of an example of an exhaust-gas turbocharger 1, which comprises an exhaust-gas turbine 20, a fresh-air compressor 30 and a rotor bearing 40. The exhaust-gas turbine 20 is equipped with a wastegate valve 29 and an exhaust-gas mass flow AM is indicated by arrows. The fresh-air compressor 30 has an overrun air recirculation valve 39 and a fresh-air mass flow FM is likewise indicated by arrows. A turbocharger rotor 10, as it is known, of the exhaust-gas turbocharger 1 has a turbine rotor 12 (also referred to as turbine wheel), a compressor rotor 13 (also referred to as compressor wheel) and a rotor shaft 14 (also referred to as shaft). The turbocharger rotor 10 rotates about a rotor axis of rotation 15 of the rotor shaft 14 during operation. The rotor axis of rotation 15 and at the same time the turbocharger axis 2 (also referred to as longitudinal axis) are illustrated by the indicated centerline and identify the axial orientation of the exhaust-gas turbocharger 1. The turbocharger rotor 10 is supported with its rotor shaft 14 by means of two radial bearings 42 and one axial bearing washer 43. Both the radial bearings 42 and the axial bearing washer 43 are supplied with lubricant via oil supply ducts 44 of an oil connection 45.

As a rule, a conventional exhaust-gas turbocharger 1, as illustrated in FIG. 1, has a multipart construction. Here, a turbine housing 21 that is arrangeable in the exhaust tract of the internal combustion engine, a compressor housing 31 that is arrangeable in the intake tract of the internal combustion engine, and, between the turbine housing 21 and compressor housing 31, a bearing housing 41 are arranged alongside one another with respect to the common turbocharger axis 2 and connected together in terms of assembly.

A further structural unit of the exhaust-gas turbocharger 1 is represented by the turbocharger rotor 10, which has the rotor shaft 14, the turbine rotor 12, arranged in the turbine housing 21, having rotor blading 121, and the compressor rotor 13, arranged in the compressor housing 31, having rotor blading 131. The turbine rotor 12 and the compressor rotor 13 are arranged on the opposite ends of the common rotor shaft 14 and connected for conjoint rotation thereto. The rotor shaft 14 extends in the direction of the turbocharger axis 2 axially through the bearing housing 41 and is provided therein with rotary support in the axial and radial directions about its longitudinal axis, the rotor axis of rotation 15, wherein the rotor axis of rotation 15 lies on the turbocharger axis 2, i.e. coincides therewith.

The turbine housing 21 has one or more exhaust-gas annular ducts, referred to as exhaust-gas channels 22 or spiral paths, that are arranged annularly around the turbocharger axis 2 and the turbine rotor 12 and narrow helically toward the turbine rotor 12. These annular ducts 22 each have their own or a common exhaust-gas feed duct 23, directed tangentially outward, with a manifold connection branch 24 for connecting to an exhaust-gas manifold (not illustrated) of an internal combustion engine, through which the exhaust-gas mass flow AM flows into the particular exhaust-gas channel 22. The exhaust-gas channels 22 furthermore each have a slit-type opening extending at least over a part of the inner circumference, referred to as the exhaust-gas inlet slit 25, which extends at least partly in a radial direction toward the turbine rotor 12 and through which the exhaust gas mass flow AM flows onto the turbine rotor 12.

The turbine housing 21 furthermore has an exhaust-gas discharge duct 26, which extends away from the axial end of the turbine rotor 12 in the direction of the turbocharger axis 2 and has an exhaust-gas connection flange 27 (also exhaust connection branch) for connecting to the exhaust system (not illustrated) of the internal combustion engine. Via this exhaust-gas discharge duct 26, the exhaust-gas mass flow AM emerging from the turbine rotor 12 is discharged into the exhaust system of the internal combustion engine.

Over a particular region, between the exhaust-gas inlet slit 25 and exhaust-gas discharge duct 26, the radial inner contour of the turbine housing 21 follows the outer contour of the turbine rotor 12 accommodated therein. This region of the inner contour of the turbine housing 21 is denoted turbine sealing contour 28 and has the effect that the exhaust-gas mass flow AM flows as completely as possible through, and not past, the rotor blading 121 of the turbine rotor 12. In this respect, it is necessary for as small a gap as possible to be ensured between the sealing contour 28 of the turbine housing 21 and the outer contour of the turbine rotor 12 during operation, this allowing free rotation of the turbine rotor 12 but limiting flow-around losses to a minimum.

The wastegate valve 29 is a corresponding bypass-valve device on the turbine side. The wastegate valve 29 connects the exhaust-gas feed duct 23, upstream of the turbine rotor 12 in the direction of flow of the exhaust-gas mass flow AM, to the exhaust-gas discharge duct 26, downstream of the turbine rotor 12 in the direction of flow of the exhaust-gas mass flow AM, via a wastegate duct 291 in the turbine housing 21. The wastegate valve 29 can be opened or closed via a closing device, for example a wastegate flap 292.

Further details of the turbocharger 1 are not explained more specifically.

Figure 2:
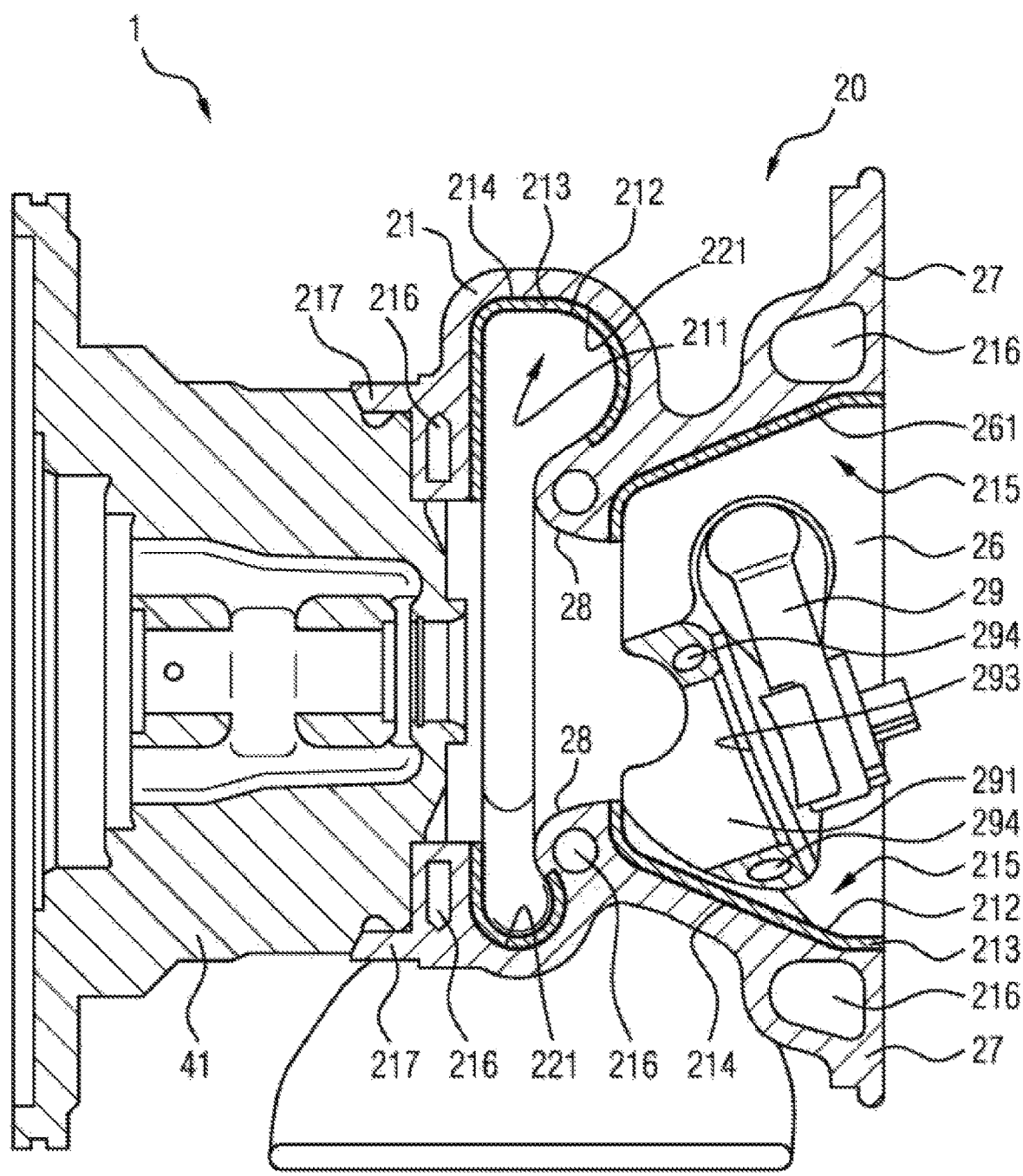
FIG. 2 shows a schematic partial sectional view of a turbocharger according to an exemplary embodiment of the invention.

FIG. 2 shows a cross-sectional partial view of a turbocharger 1 according to an embodiment of the invention, on the basis of which the configuration of the turbine housing 21 is described in more detail. The turbine housing 21 is distinguished by selective cooling and thermal insulation. It should be noted that details of the turbocharger 1 illustrated in FIG. 1 differ from the turbocharger 1 explained on the basis of FIG. 1.

The turbine housing 21 is produced from a light metal material such as gray cast iron, although other materials are also conceivable.

According to FIG. 2, an inner wall 221 of the annular duct 22 is provided with a first insulating element 211. The insulating element 211 is matched to the shaping of the inner wall 221 of the annular duct 22, and at least partially lines the latter. The insulating element 211 is an inlay part, which has three layers 212 to 214. The first layer 212 faces the exhaust-gas mass flow AM during operation and represents an inner skin of the insulating element 211. The first layer 212 is produced from a metal material, for example a metal material that is resistant to high temperatures, for example as a metal sheet. The second layer 213 is in the form of an insulating layer and exhibits insulating material, for example ceramic. The third layer 214 faces the turbine housing 21, i.e. the inner wall 221. The third layer 214 can likewise consist of a metal material that is resistant to high temperatures. The first insulating element 211 is molded into the turbine housing 21. For example, only the third layer 214 is molded in. Alternatively, two or all of the layers 212 to 214 are molded in.

In a similar manner to the first insulating element 211, a second insulating element 215 is provided, which is arranged in the region of the exhaust-gas discharge duct 26 on an inner wall 222 of the turbine housing 21. It has the same layers 212 to 214 and is in the form of an inlay part. The second insulating element 215 is likewise molded into the turbine housing 21.

As is apparent from FIG. 2, the sealing contour 28 of the turbine housing 21 is free of any insulating element. Furthermore, in the region of a bearing-housing connection flange 217 and of the exhaust-gas connection flange 14, no further thermal insulation is provided, since there are high tolerance demands in this region, as described at the beginning. Furthermore, the region of the wastegate valve 29, in particular the wastegate duct 291, is also not provided with any insulation.

In order to ensure sufficient cooling of the turbine housing 21, local cooling is provided in the abovementioned regions. This is water cooling, wherein cooling ducts 216 have been introduced into the turbine housing 21, water flowing as cooling medium through said cooling ducts 216 during operation, in order to absorb thermal energy.

Thus, in the regions which have been machined and on which high tolerance demands are placed, no insulating elements are provided, but rather local cooling.

Figure 3:
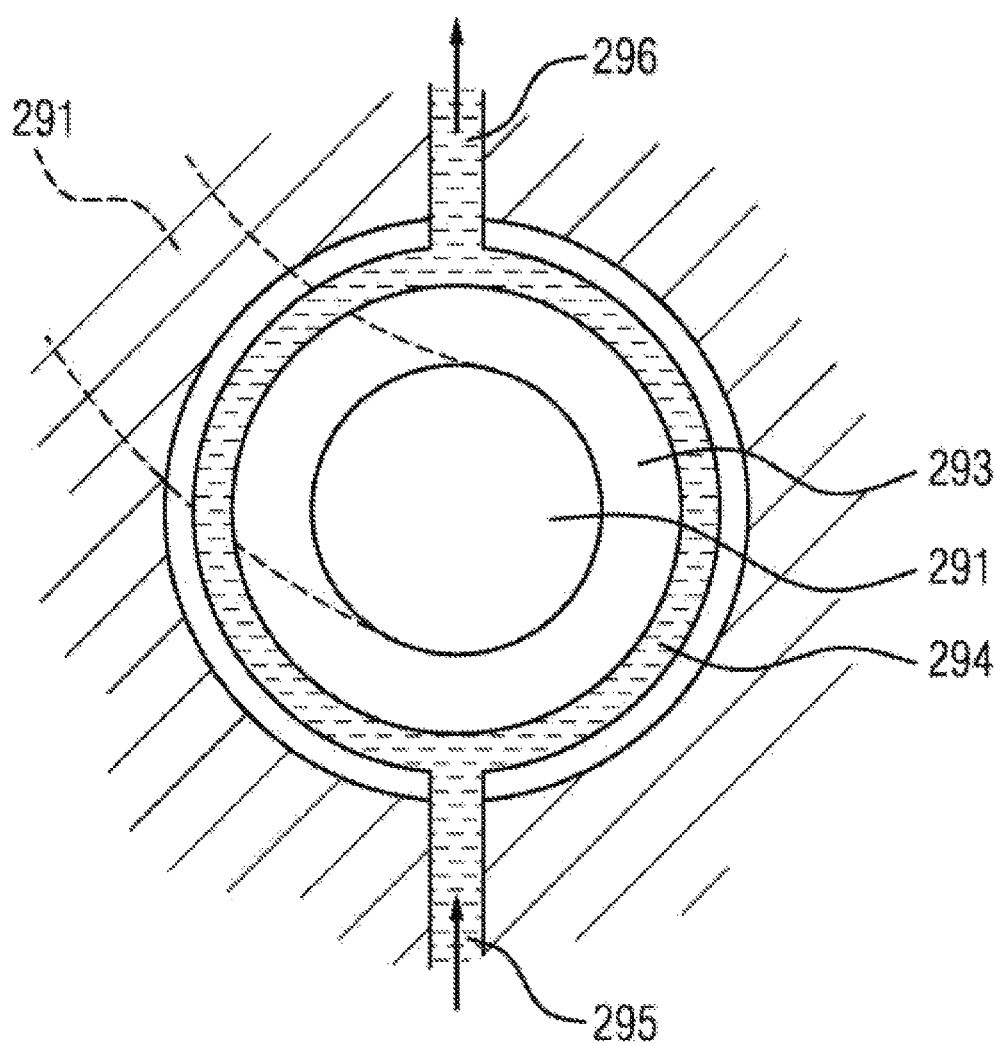
FIG. 3 shows a schematic illustration of a wastegate valve seat of the turbocharger according to the exemplary embodiment of the invention.

As is apparent from FIGS. 2 and 3, local cooling is provided at a wastegate valve seat 293 of the wastegate valve 29. In this case, the cooling is internal water cooling 294 of the wastegate valve seat 293, which extends in a duct-like manner around the wastegate valve seat 293, such that water as cooling medium can absorb thermal energy. The water cooling 294 has a water inflow 295 and a water return flow 296. This is illustrated schematically in FIG. 3.

The described turbocharger 1 is distinguished by the combination of selective insulation and water cooling of the turbine housing 21. As mentioned at the beginning, the mentioned advantages and functions can be achieved as a result. In particular a less thermally resistant material, for example a light metal material, can be used for the turbine housing 21, this having considerable price advantages compared with cast materials that are resistant to height temperatures. The combination of selective cooling and insulation results in increased turbine efficiency and thus an overall efficiency of the turbocharger 1 than for example in the case of peripherally cooled, for instance water-cooled, turbine housings. Furthermore, the component temperatures of the turbine housing 21 can be lowered to a required level. As a result of the provision of local cooling in the region of the bearing-housing connection flange 217, it is also possible for local cooling integrated into the bearing housing 41 to be dispensed with, since the latter is simultaneously cooled via the turbine housing 21.

The insulating elements 211 and 215 are alternatively configured in some other way. For example, one or both insulating elements 211 and 215 exhibit(s) a metal foam, for example as second layer 213. In a further alternative, one or both insulating elements 211 and 215 is/are not molded into the turbine housing 21, but merely inserted. In this case, an insulating element 211 and/or 215 can be fixed mechanically during the assembly of the turbocharger 1, for example clamped. Furthermore, it is also conceivable for one or both insulating elements 211 and 215 to be applied as a coating to the corresponding inner walls of the turbine housing 21.

It should be noted that the turbocharger 1 described on the basis of FIGS. 2 and 3 can be configured as per the turbocharger explained schematically on the basis of FIG. 1.

This is not absolutely necessary, however. The turbocharger 1 according to FIGS. 2 and 3 can have alternative configurations.

The invention claimed is:

1. A turbine housing for a turbocharger of an internal combustion engine, the turbine housing comprising:
   a turbine wheel disposed in the turbine housing;
   an annular duct for conducting an exhaust-gas mass flow to said turbine wheel, said annular duct having an inner wall;
   an exhaust-gas discharge duct for discharging the exhaust-gas mass flow from the turbine housing after impinging on said turbine wheel, said exhaust-gas discharge duct having an inner wall;
   insulating elements, a first one of said insulating elements being disposed within said annular duct over a region of said inner wall of said annular duct and a second one of said insulating elements being disposed within said exhaust-gas discharge duct over a region of said inner wall of said exhaust-gas discharge duct; and
   a longitudinal axis and a sealing contour, said sealing contour being free of any insulating element between said exhaust-gas discharge duct and said annular duct relative to said longitudinal axis.

2. The turbine housing according to claim 1, which further comprises a wastegate valve seat, a bearing-housing connection flange and an exhaust-gas connection flange, the turbine housing being free of any insulating element in a region of at least one of said wastegate valve seat, said bearing-housing connection flange or said exhaust-gas connection flange.

3. The turbine housing according to claim 1, wherein at least one of said insulating elements is a layer applied at least partially to at least one of said inner wall of said annular duct or said inner wall of said exhaust-gas discharge duct.

4. The turbine housing according to claim 1, wherein at least one of said insulating elements is an inlay element inserted or at least partially molded in or at least partially encapsulated into the turbine housing.

5. The turbine housing according to claim 4, wherein said at least one insulating element is a multilayer element including a first layer facing an exhaust-gas mass flow during operation and exhibiting a material resistant to high temperatures, and a second insulating layer following said first layer.

6. The turbine housing according to claim 5, wherein said at least one insulating element includes a third layer following said second layer and facing at least one of said inner wall of said annular duct or said inner wall of said exhaust-gas discharge duct.

7. The turbine housing according to claim 6, wherein said third layer is firmly connected to the turbine housing.

8. The turbine housing according to claim 1, wherein at least one of said insulating elements includes a metal foam.

9. The turbine housing according to claim 1, which further comprises a sealing contour, a bearing-housing connection flange, an exhaust-gas connection flange, and local cooling in a region of at least one of said sealing contour, said bearing-housing connection flange or said exhaust-gas connection flange.

10. The turbine housing according to claim 1, which further comprises a wastegate valve seat and local cooling in a region of said wastegate valve seat.

11. The turbine housing according to claim 6, wherein, said first layer is a metal layer, said second layer is an insulating material layer, and said third layer is a metal layer.

12. The turbine housing according to claim 1, wherein said insulating elements are spaced apart from one another with respect to an exhaust-gas flow direction of the turbine housing.

13. A turbocharger for an internal combustion engine, the turbocharger comprising:
    a bearing housing;
    a rotor shaft rotatably mounted in said bearing housing;
    a turbine housing according to claim 1 being mechanically secured to said bearing housing; and
    said turbine wheel disposed for conjoint rotation on said rotor shaft.

* * * * *